US010760511B2

(12) United States Patent
Markman et al.

(10) Patent No.: US 10,760,511 B2
(45) Date of Patent: Sep. 1, 2020

(54) APPARATUS FOR CONTROLLING ENGINE IDLE AND USES THEREOF

(71) Applicant: HONDA MOTOR CO., LTD., Minato-ku, Tokyo (JP)

(72) Inventors: Thomas J. Markman, Plain City, OH (US); Tomoharu Hozumi, Dublin, OH (US); Joaquin A. Pelaez, Hilliard, OH (US); Andrew G. Shapiro, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 16/010,185

(22) Filed: Jun. 15, 2018

(65) Prior Publication Data
US 2019/0383226 A1 Dec. 19, 2019

(51) Int. Cl.
*F02D 41/08* (2006.01)
*F02P 5/15* (2006.01)
*F16H 63/50* (2006.01)
*F16H 59/68* (2006.01)
*F02D 41/02* (2006.01)

(52) U.S. Cl.
CPC .......... *F02D 41/08* (2013.01); *F02D 41/0225* (2013.01); *F02P 5/1508* (2013.01); *F16H 63/50* (2013.01)

(58) Field of Classification Search
CPC ........ F02D 41/08; F02P 5/1508; F16H 63/50; F16H 2059/6823
See application file for complete search history.

(56) References Cited

U.S. PATENT DOCUMENTS

| | | | |
|---|---|---|---|
| 5,199,326 A | * | 4/1993 | Iwatsuki ............... B60W 10/06 180/69.3 |
| 5,480,364 A | | 1/1996 | Hilbert et al. |
| 7,086,988 B2 | | 8/2006 | Fett et al. |
| 7,141,000 B2 | | 11/2006 | Mori et al. |
| 7,165,530 B2 | | 1/2007 | Jensen et al. |
| 7,169,078 B2 | | 1/2007 | Ishikawa et al. |
| 9,561,798 B2 | | 2/2017 | Jerger et al. |

(Continued)

FOREIGN PATENT DOCUMENTS

| | | |
|---|---|---|
| CN | 102745190 A | 10/2012 |
| CN | 104005865 A | 8/2014 |

(Continued)

*Primary Examiner* — Tisha D Lewis
(74) *Attorney, Agent, or Firm* — Arent Fox, LLP (57) ABSTRACT

An apparatus, method, and system for controlling an idle speed of an internal combustion engine during certain vehicle component operations to minimize unwanted motion and vibration. A transmission neutral engagement, a transmission forward or reverse gear engagement, and a vehicle speed are detected. An engine target idle speed is set to a first speed during the neutral engagement. An engine target idle speed is set to a second idle speed when a vehicle speed is less than a threshold speed and the forward or reverse gear is activated. The vehicle target idle speed is set to a third idle speed when the vehicle speed is greater than a threshold speed while the forward or reverse gear is activated, wherein the first target idle speed, second target idle speed and third target idle speed are different engine speeds.

20 Claims, 8 Drawing Sheets

(56) References Cited

U.S. PATENT DOCUMENTS

2014/0083392 A1    3/2014  Cattani et al.
2016/0159357 A1*   6/2016  Pursifull ......... B60W 30/18109
                                                         701/51

FOREIGN PATENT DOCUMENTS

| | | | | |
|---|---|---|---|---|
| CN | 104144835 A | 11/2014 | | |
| DE | 102012206220 A1 * | 10/2012 | ........... | F02D 31/001 |
| EP | 0 127 085 A2 | 12/1984 | | |
| JP | H05280398 A | 10/1993 | | |

* cited by examiner

APPARATUS FOR CONTROLLING ENGINE IDLE AND USES THEREOF

FIELD OF THE INVENTION

Aspects of the present disclosure relate to an engine idle speed control device and method for use with an internal combustion engine. More specifically, aspects of the present disclosure relate to a device and method for controlling the idle speed of an internal combustion engine appropriately when a vehicle brake is released and a vehicle begins to accelerate after the vehicle transmission is switched from neutral to a reverse gear.

BACKGROUND

In motor vehicles, particularly vehicles powered with an internal combustion engine, it is desirable to control or reduce noise or vibration. One cause of vibration is the internal combustion engine itself, as well as other components of the driveline, such as an automatic transmission. An internal combustion engine idle speed is frequently referred to in rotations per minute ("RPM"). Variances in idling RPM of an internal combustion engine during various operating conditions, such as when a vehicle is in neutral or when a vehicle brake is applied while the vehicle is in a forward or reverse gear, may cause undesirable noise or vibration that would not be apparent during normal operation of the vehicle. Accordingly, an internal combustion engine may be controlled to idle at higher RPM to reduce noise and vibration under certain operating conditions. Further, upon cold start-up, an internal combustion engine may be controlled to run at a higher RPM to warm-up or achieve stable operation. One negative effect of controlling an internal combustion engine to run at higher RPM in certain conditions is that a user of the vehicle may experience variation in speed when a vehicle is placed into a forward or reverse gear while the internal combustion engine is running at the higher RPM. Among other things, aspects of the present disclosure allow for the controlling the idle of an internal combustion engine at varying RPM while preventing variations in speed or a higher than desired speed of travel once a vehicle is placed into a forward or reverse gear. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, disclosed is an apparatus, method, and system for controlling an idle speed of an internal combustion engine. A transmission neutral engagement, a transmission forward or reverse gear engagement, and a vehicle speed are detected. An engine target idle speed is set to a first speed during the neutral engagement. An engine target idle speed is set to a second idle speed when a vehicle speed is less than a threshold speed and the forward or reverse gear is activated. The vehicle target idle speed is set a third idle speed when the vehicle speed is greater than a threshold speed while the forward or reverse gear is activated. The first target idle speed may be greater than a second target idle speed and the third target idle speed may be less than the second target idle speed.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

Figure 1:
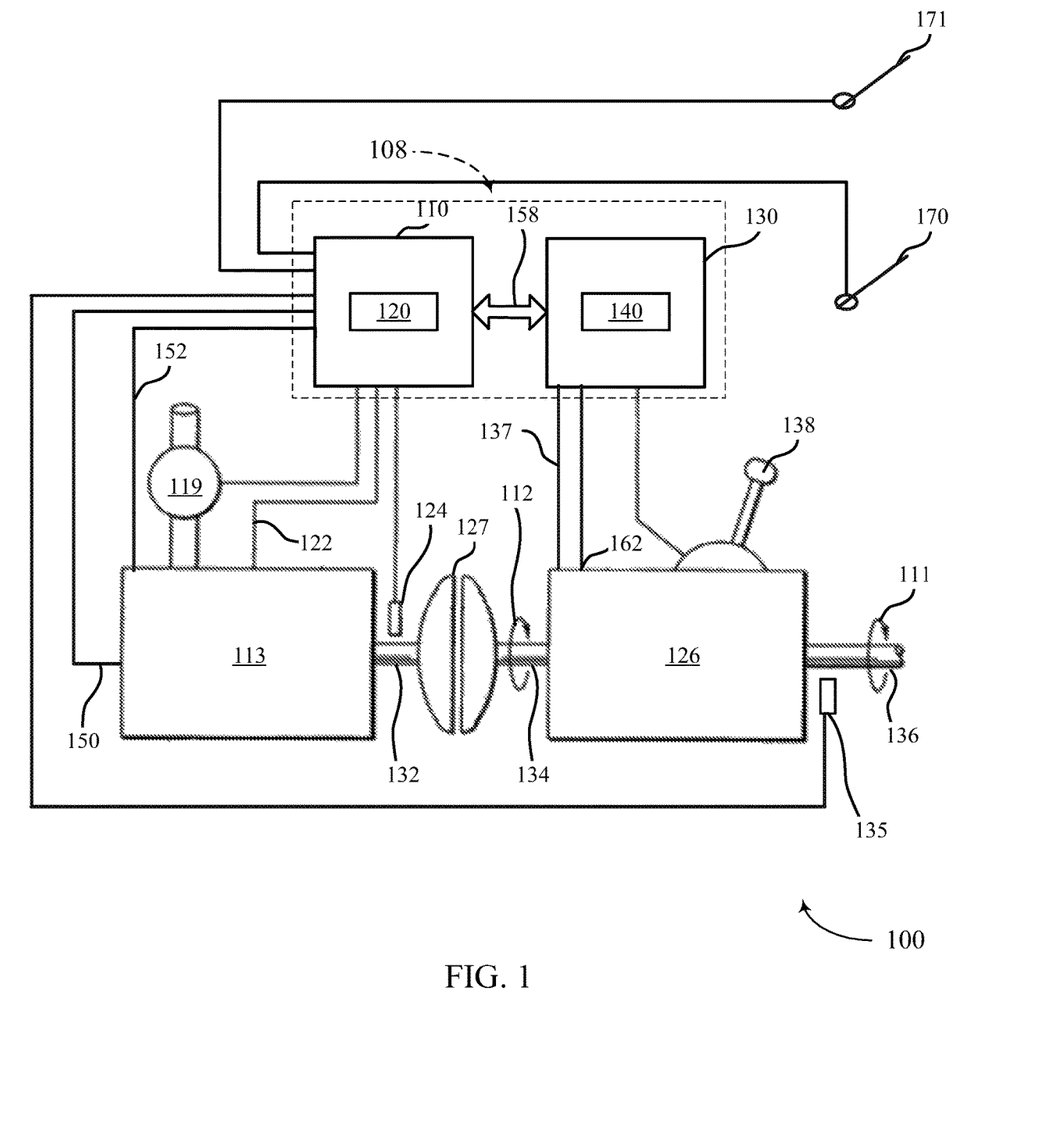
FIG. 1 is a representative block diagram of various example elements of a powertrain and control system usable in accordance with an aspect of the disclosure.

Aspects of the disclosure relate to a powertrain control system and methods of use. The powertrain apparatus and systems shown in FIGS. 1-7 may include similar components; however, various differences may be noted throughout the disclosure. The figures and corresponding description are intended to show various examples that may be used separately or in combination. FIG. 1 shows in representative diagram form various example components of a powertrain and control system of a vehicle for use in accordance with aspects of the current disclosure. As shown in FIG. 1, a vehicle powertrain 100 may include an internal combustion engine 113, and a transmission 126. The internal combustion engine 113 may include a crankshaft 132, which may be connected to a torque converter and/or clutch assembly 127. The other side of the torque converter and/or clutch assembly 127 may provide an input torque 112 to an input shaft 134 of the transmission 126. The transmission 126 may provide an output torque 111 at an output shaft 136, which may be connected a transfer case, a driveshaft, a differential, and/or axles, for example. The transmission 126 may be electronically controlled and may have at least one gear engagement control input 138 (also interchangeably referred to herein as a gear selector) for engaging a single or plurality of drive gear(s) and a neutral gear in the transmission. The engine 113 may further include an idle air control valve 119 for providing combustion air to the engine 113. The idle air control valve, and/or a fuel supply (not shown), and/or an engine ignition (not shown) may be varied to control an engine speed. The idle air control valve 119 may be controlled via a powertrain control module (PCM) 108, for example. A spark angle control line 122 from the PCM 108 may control the ignition angle of internal combustion engine 113, for example. The PCM 108 may further be in signal communication 150 with a single or plurality of exhaust sensor(s) located within or in proximity to the engine 113. The exhaust sensor(s) via communication 150 may output a signal corresponding with the composition, temperature, and/or flow of exhaust gas from engine 113.

As shown in FIG. 1, the PCM 108 may include an engine portion 110 and a transmission portion 130. The two portions 110, 130 may be in signal communication via a communication channel 158. In one example, each one of the engine portion 110 and the transmission portion 130 may have its own microprocessor, with the communications channel 158 comprising a dual-port random access memory (DPRAM) and/or communication bus in a communications path between the engine portion 110 and the transmission portion 130. In another aspect, the engine portion 110 and the transmission portion 130 may be or include physically separated controllers, with the communications channel 158 comprising a network for communication between them. In yet another aspect, PCM 108 may have a single microprocessor, with each of the transmission portion 130 and the engine portion 110 being implemented in software within a single memory location.

Each of the transmission portion 130 and the engine portion 110 may execute instructions from its respective memory 140 and 120. The instructions may, for example, provide operation direction to the engine and/or transmission as described further below. Engine portion 110 may receive a throttle signal from throttle pedal position sensor 170, for example, and also may receive a crankshaft signal from a crankshaft sensor 124. Further, the engine portion 110 may receive a brake function active signal from at least one brake switch 171. The brake sensor 171 may include a brake pedal switch and/or a parking brake switch, for example. The brake sensor 171 may further include a brake pedal position monitoring sensor and/or may include a parking brake position monitoring sensor, for example. The brake switch may further include a pressure sensor and/or a position sensor for determining a brake pedal position or the speed and force at which a user presses a brake pedal. Further, the brake sensor 171 may provide a brake function active signal in response to brakes being automatically applied to a single or multiple wheels of a vehicle during a traction control, anti-lock braking, and/or hill start assist event, for example. Further, in combination with or as an alternative to the aforementioned pedal and/or parking brake switches, the brake sensor 171 may include one or more sensors at a single one of or at each of a plurality of wheels of the vehicle. An exhaust sensor may provide, for example, an exhaust flow rate, an exhaust composition and/or a catalyst temperature signal via communication 150 to the engine portion 110. An engine temperature sensor or plurality of sensors, which may for example be engine coolant temperature sensor(s), may provide a signal via communication 162 to the engine portion 110. Further, any of the aforementioned sensor data may be simulated or estimated by the respective engine portion 110 and/or transmission portion 130 of the PCM 108. The transmission portion 130, may further receive a signal from a gear selector switch 138. A transmission temperature sensor or plurality of sensors, which may for example be a transmission fluid temperature sensor(s), may provide a signal via communication 162 to the transmission portion 130. In one example, the transmission portion 130 may receive a signal corresponding to the position in which an operator places the gear selector 138, which is also interchangeably referred to herein as a gear selection signal. Some non-limiting examples of gear lever positions and a corresponding gear selection signals that may be generated corresponding thereto include neutral ("N") Drive ("D") and reverse ("R"). In one example, the transmission portion 130 may receive the gear selection signal as a message from a vehicle network arrangement. A speed sensor 135 may provide speed information based on RPM data relating to output shaft 136. Further, either in combination with or as an alternative thereto, speed sensor 135 may include a single or plurality of sensors to output a signal corresponding with the rotation of any single or combination of wheels of the vehicle. Further, the speed sensor 135 may combine sensed input with global positioning system ("GPS") information, for example, to determine a vehicle speed and/or acceleration. In one example operation of the aforementioned components, when the transmission 126 is in an N gear, the output torque 111 may be approximately zero. Conversely, when the transmission 126 is in a D gear, the output torque 111 may be a multiple of or fraction of input torque 134.

Figure 2:
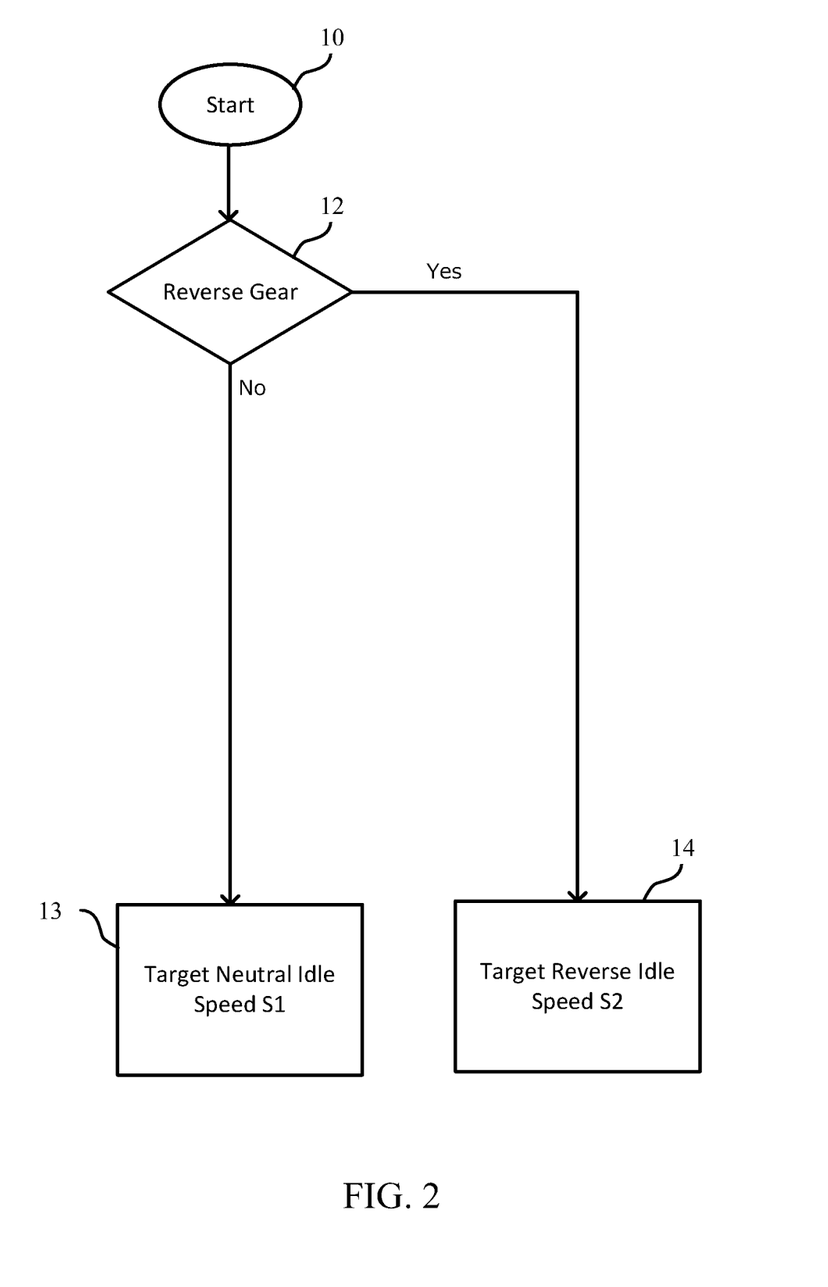
FIG. 2 is a diagram for outlining a process in accordance with one aspect of the disclosure.

FIG. 2 is a representative flow chart of one example of operation activity in accordance with aspects of the current disclosure. After a vehicle is started at 10, if a reverse gear is not selected, and if the transmission selector remains in neutral, for example, a target neutral idle engine speed may be controlled to a first speed S1 13. Further, a user may select a reverse gear at step 12. However, because the target neutral idle speed S1 may not be an appropriate speed for a forward or reverse operation of the vehicle, engine speed may be controlled to a target reverse idle speed S2 14 upon engagement of a forward or reverse gear. In the example shown in FIG. 2, the idle speed is controlled in response to reverse gear operation. While also applicable to forward gear operation, a reverse gear in vehicle transmission is generally taller than the first forward gear of a vehicle transmission and the method for varying idle speed may differ accordingly. Thus, since a taller gear has less gear reduction and a lower numerical ratio, for example, reverse gear speed may be higher for a given engine RPM than a first forward gear, and idle may be correspondingly reduced at S2.

Thus, in the example shown in FIG. 2, the target neutral idle speed S1 may be higher than the target reverse idle speed S2 to assure that a reverse speed of the vehicle is appropriate when a user operates the vehicle in reverse. However, in the aforementioned example, a reverse gear may be selected at step 12 and a brake pedal and/or parking brake may be contemporaneously applied to prevent or slow the reverse movement of the vehicle. Under such a scenario, the engine may be controlled to the lower target reverse idle speed S2 while the vehicle remains stationary. In such a condition unwanted additional vibration and/or noise associated with the target reverse idle speed S2 may be observed by a user and/or passengers of the vehicle. Accordingly, to further reduce noise and/or vibration while maintaining an appropriate vehicle speed when the vehicle is operated in reverse in this scenario, the idle speed of the engine may be controlled as shown in FIG. 3, for example.

Figure 3:
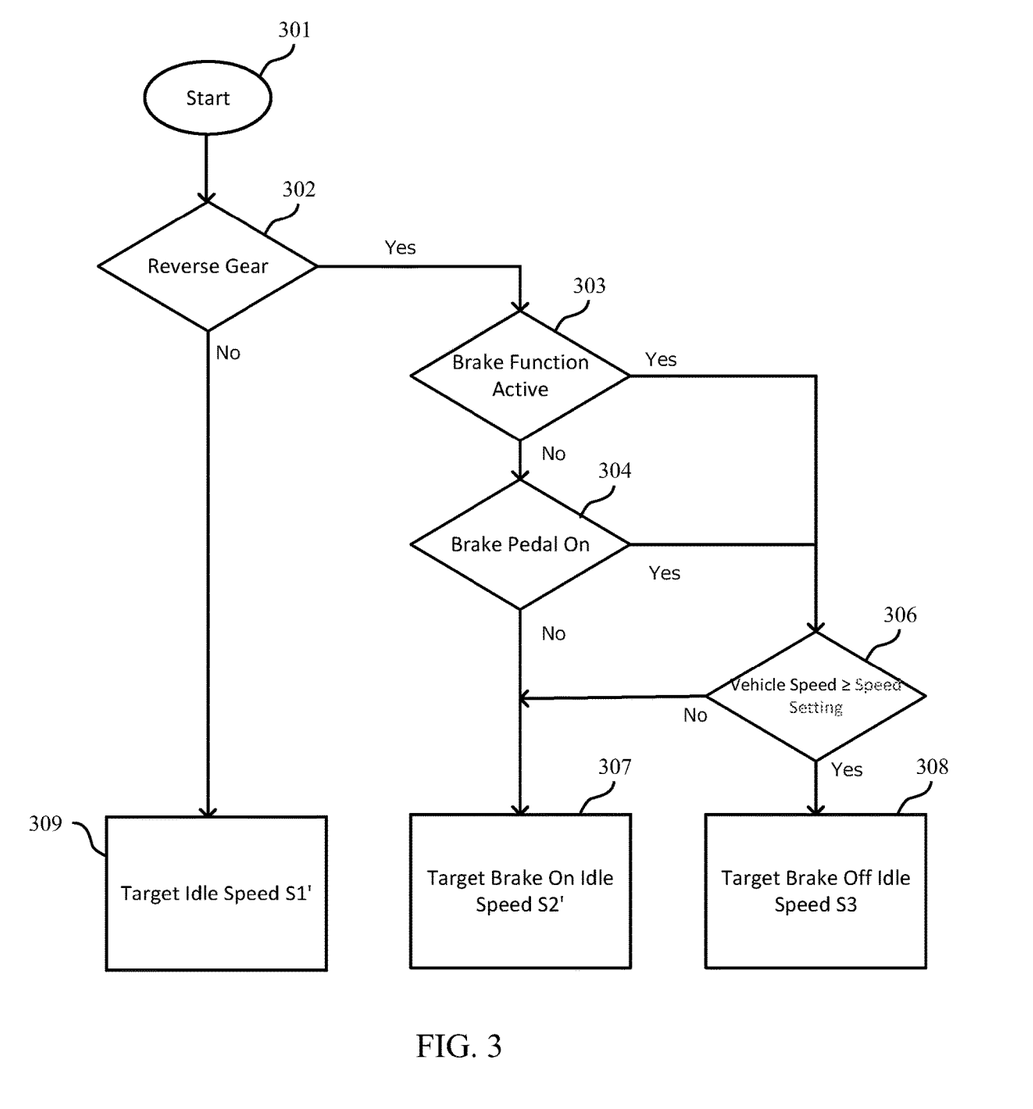
FIG. 3 is a diagram for outlining a process in accordance with one aspect of the disclosure.

In FIG. 3, a vehicle engine is controlled to at least three different target idle speeds. Amongst other advantages, controlling the engine at three different target idle speeds allows for an acceptable balance between noise and/or vibration and vehicle reverse speed under a variety of conditions. For example, after a vehicle is started at 301, a first target idle speed S1' may be maintained if the vehicle transmission remains in a neutral and/or park setting, for example. A first target idle speed S1' may for example be the same engine speed as S1 in FIG. 2 or may be a different speed.

As shown in FIG. 3, when a reverse gear is selected at step 302 at least one of two possible target idle speeds may be selected based on the state of the brake function (e.g., based on an output from brake sensor 171 in FIG. 1). In one example, if a reverse gear is selected and a brake function is active at 303, it may be determined if a vehicle speed is greater than or equal to a threshold vehicle speed setting at step 306. A brake function man include for example, a parking brake signal, a brake hold signal or the like. In one example, the threshold vehicle speed setting in step 306 may be 0. In another example, the threshold vehicle speed setting in step 306 may be 2 miles per hour or less. If the vehicle speed is determined to be less than or equal to the threshold vehicle speed setting in step 306, the engine may be controlled to maintain a target brake on idle speed S2' at 307. The target brake on idle speed S2' may for example be the same speed or a different speed from the target brake on idle speed S2 referenced in FIG. 2. The target brake on idle speed S2' may be less than target idle speed S1' and therefore may cause an increase in vibration and/or noise observed within the vehicle. However, the decreased target brake on idle speed S2' may be set such that any vibration and/or noise associated with speed S2' is less than a lower target brake off idle speed S3 at 308.

As shown in FIG. 3, if a vehicle speed is determined to be greater than or equal to a speed setting threshold in step 306, the engine speed may be controlled to a target brake off idle speed S3. The target brake off idle speed S3 may be less than both of speeds S1' and S2'. In one aspect, the target brake off idle speed S3 may be a low engine speed that does not cause undesirable vibration and/or noise when a vehicle is moving, but would cause vibration and/or noise if a vehicle was placed in a neutral gear and/or if the vehicle were to be placed in a reverse gear with the brake applied. Thus, the process shown in FIG. 3 would result in a low engine speed that may be desirable for operating the vehicle in reverse while preventing excessive noise and/or vibration, since the engine is only controlled to a target brake off idle speed S3 when vehicle movement is detected.

Figure 4A:
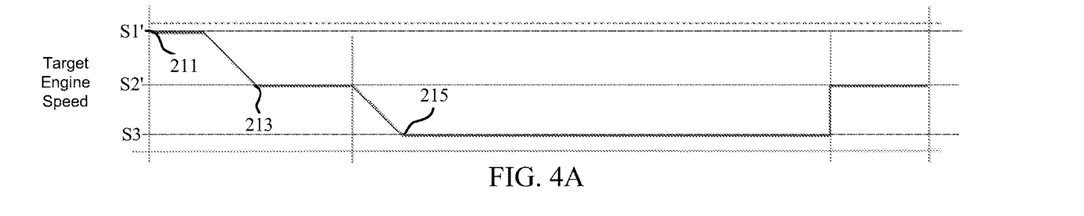
FIGS. 4A-E are a series of time charts showing one example of an idle control in accordance with one aspect of the disclosure.
Figure 4B:
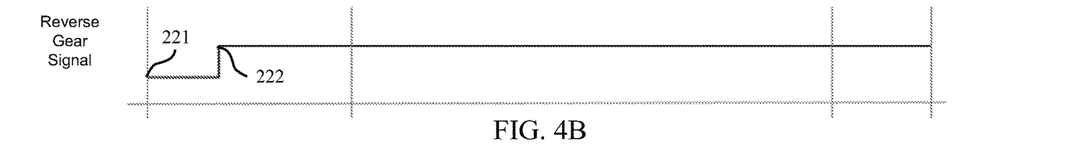
Figure 4C:
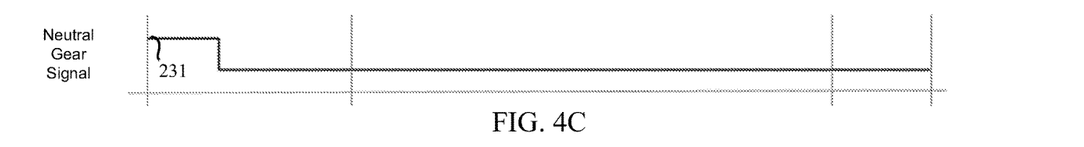

With reference to FIGS. 4A-4E, operation of various features and conditions, in accordance with aspects of the disclosure, is shown in a time-correlated format wherein the x-axis of each graph represents time. The y-axis of each graph shown in FIGS. 4A-4E represents the relative quantity stated in each graph's y-axis label. As shown in FIG. 4A, curve 210 represents one example of target engine speed with relation to time during various operating conditions. Graph 4B shows one example of a curve of transmission reverse signal output, and graph 4C shows one example of a curve of transmission neutral signal output. Further, graph 4D shows one example of a curve of brake signal output, and graph 4E shows an example of a curve of vehicle speed data.

In one example operation, an engine speed may be controlled to a first target engine speed S1' as represented by reference 211 in graph 4A, which may occur while a vehicle transmission is in neutral, for example. At this time in the graphs of FIGS. 4A-4E, when a vehicle neutral signal is present 231 (FIG. 4C) and a reverse gear signal is not present 221 (FIG. 4B), the target engine speed S1' (FIG. 4A) may be an engine speed that is known to reduce noise and/or vibration, but may be higher than an optimal engine speed for operation of the vehicle in a reverse gear. While FIG. 4D shows a brake signal present 241, the engine may also be controlled to target engine speed S1' (FIG. 4A) when a brake signal is not present.

Once the transmission is shifted from a neutral gear to a reverse gear while a brake function of the vehicle is in use, i.e., a neutral gear signal is not present, a reverse gear signal is present 222 (FIG. 4B), and a brake signal remains shown as present 241 (FIG. 4D), the target engine speed may be gradually decreased from the first target S1' (FIG. 4A) to a second target engine speed S2' at time 213 (FIG. 4A). The second target engine speed S2' (FIG. 4A) may be an engine speed that causes some vibration and/or noise, but is considered appropriate for operating a vehicle in a reverse speed. Further the second target engine speed S2' (FIG. 4A) may be an engine speed that assists in preventing a user or passengers of the vehicle from detecting or noticing a change in engine speed from S1' to S3 (FIG. 4A). Once a brake signal is no longer present 242 (FIG. 4D), and the vehicle speed begins to increase from zero at 252 to a threshold speed 253 (FIG. 4E), the target engine speed is gradually decreased from target engine speed S2' to a third target engine speed S3 at 215 (FIG. 4A). As shown in FIG. 4A, a first target engine speed S1' may be greater than a second target engine speed S2', and the second target engine speed S2' may be greater than the third target engine speed S3. Using the aforementioned control, vehicle noise and/or vibration, may be reduced while allowing the engine speed to be controlled to an appropriate idle speed when a vehicle is operated in reverse. Further, the aforementioned system may help prevent a user and/or passengers of the vehicle from detecting the variation of engine target idle speeds during a range of operations.

Figure 4D:
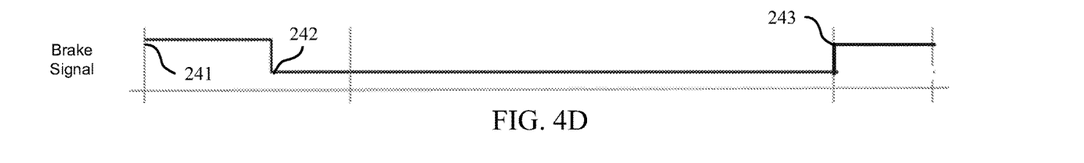

As shown in FIG. 4D, once a vehicle brake signal is received at 243 and a vehicle speed falls below a threshold value 254 (FIG. 4E), the target engine speed may be controlled to the second engine speed S2' (FIG. 4A) to decrease vibrations and/or noise associated with a lower target idle speed while a brake pedal or other brake function of the vehicle is used. Further, once the vehicle is placed in a neutral gear, the engine may be controlled to the first target idle speed S1' (FIG. 4A).

Figure 4E:
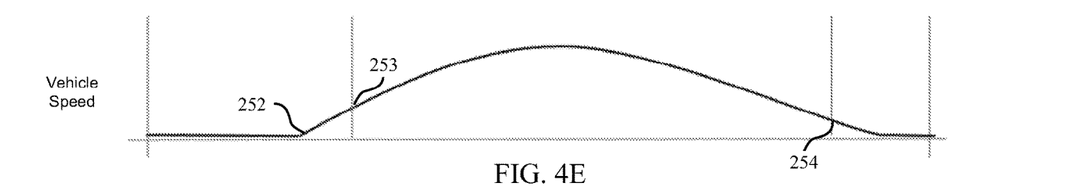
Figure 5A:
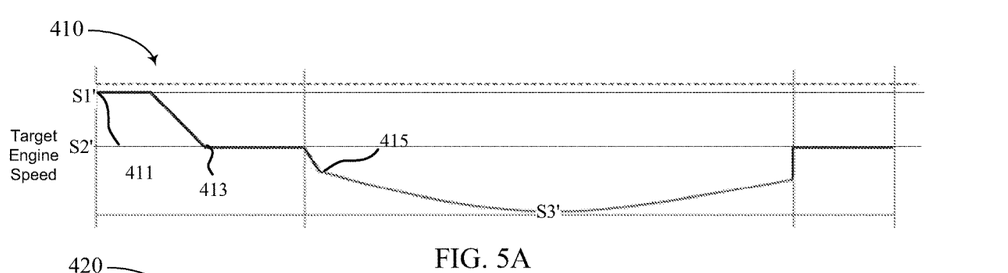
FIGS. 5A-E are a series of time charts showing one example of an idle control in accordance with one aspect of the disclosure.
Figure 5B:
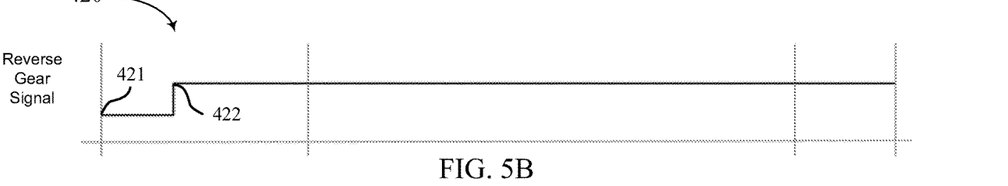
Figure 5C:
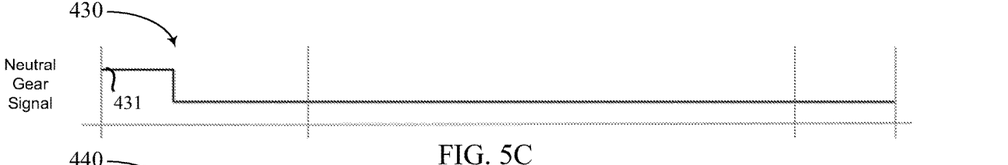
Figure 5D:
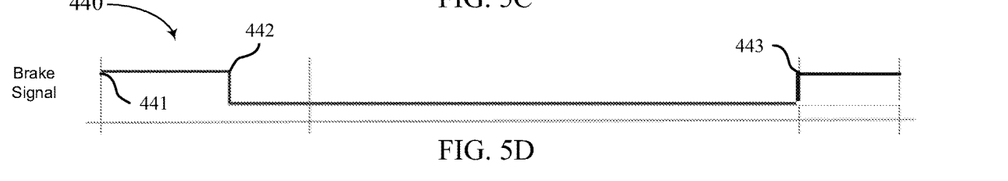
Figure 5E:
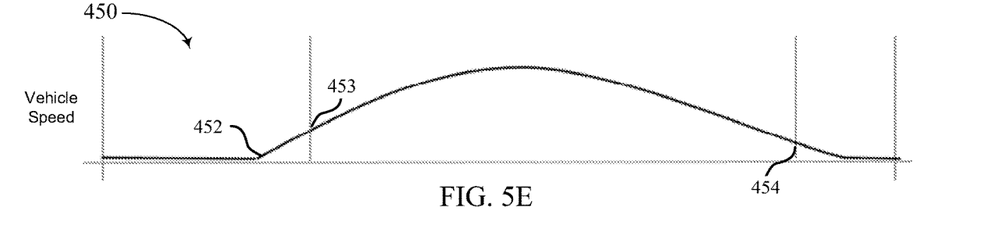

FIGS. 5A-5E show a modification of various features and operations similar to the charts shown in FIGS. 4A-4E, in accordance with an aspect of the disclosure. In FIGS. 5A-4E, shown is a third target engine speed S3' (FIG. 5A) that varies with respect to a detected vehicle speed. Similarly to FIGS. 4A-4E, FIGS. 5A-5E show curves of various features and operations in a time-correlated format wherein the x-axis of each graph represents time. The y-axis of each graph represents the quantity stated in each graph's y-axis label. FIG. 5A represents one example data curve 410 of a target engine speed with relation to time during various operating conditions. FIG. 5B shows one example of a transmission reverse signal curve 420, and FIG. 5C shows one example of a transmission neutral signal curve 430. FIG. 5D shows one example of a brake signal curve 440, and FIG. 5E shows an example of a vehicle speed curve 450.

In one example operation, engine speed may be controlled to a first target engine speed 82' as represented by reference 411 in FIG. 5A while a vehicle transmission is in neutral 431 (FIG. 5C). When a vehicle neutral signal is present 431 (FIG. 5C) and a reverse gear signal is not present 421 (FIG. 5B), the target engine speed S1' (FIG. 5A) may be controlled to an engine idle speed that is determined to reduce noise and/or vibration. While target engine idle speed S1' (FIG. 5A) may reduce noise and/or vibration when the vehicle is in a neutral gear, target engine idle speed S1' (FIG. 5A) may be higher than an optimal engine speed for operation of the vehicle in a reverse gear. Once the transmission is shifted from a neutral gear to a reverse gear while a brake function of the vehicle is in use, i.e., a neutral gear signal is not present, a reverse gear signal is present 422 (FIG. 5B), and a brake signal is present 441 (FIG. 5D), the target engine speed may be gradually decreased from the first target S1' to a second target engine speed S2' at time 413 (FIG. 5A). A second target engine speed S2' (FIG. 5A) may be an engine speed that causes some vibration and/or noise, but is considered appropriate for operating a vehicle in a reverse speed. Further the second target engine speed S2' may be an engine speed that assists in preventing a user or passengers of the vehicle from detecting or noticing a change in engine speed from S1' to S3'. Once a brake signal is no longer present 442 (FIG. 5D), and a vehicle speed begins to increase from zero at 452 to a threshold speed 453 (FIG. 5E), the target engine speed is gradually decreased from target engine speed S2' (FIG. 5A) to a third target engine speed S3' at 415 (FIG. 5A). As shown in FIG. 5A, a first target engine speed S1' may be greater than a second target engine speed S2', and the second target engine speed S2' may be greater than the third target engine speed S3'. In the aspect of the disclosure shown in FIG. 5A, the third target engine speed S3' may be a function of a vehicle speed. For example, as a vehicle's speed is increased 453 (FIG. 5E) while the vehicle is idling a reverse gear, the target engine idle speed S3' (FIG. 5A) may be gradually decreased to cause a decrease or a steady vehicle speed while the vehicle is in a reverse gear. Using the aforementioned control, vehicle noise and/or vibration may be reduced, while allowing the engine speed to be controlled to an appropriate idle speed when the vehicle is operated in reverse. Further, the aforementioned system may help prevent a user and/or passengers of the vehicle from detecting the variation of engine target idle speeds during a range of operations.

As shown in FIG. 5D, once a vehicle brake signal is received at 443 and a vehicle speed falls below a threshold value 454 (FIG. 5E), the target engine speed may be controlled to the second engine speed S2' (FIG. 5A) to decrease vibrations and/or noise associated with a lower target idle speed while a brake pedal or other brake function of the vehicle is used. Further, once the vehicle is placed in a neutral gear, the engine may be controlled to the first target idle speed S1' (FIG. 5A).

Figure 6A:
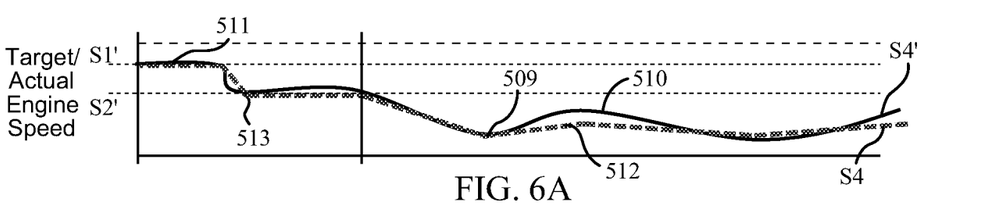
FIGS. 6A-E are a series of time charts showing one example of an idle control in accordance with one aspect of the disclosure.
Figure 6B:
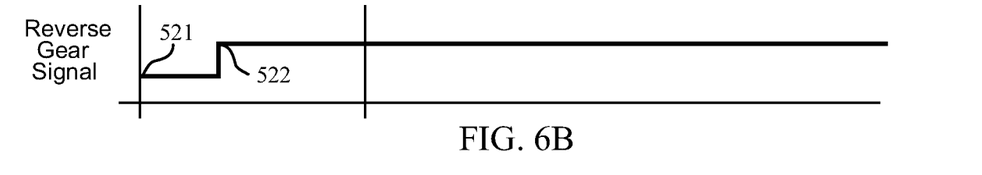
Figure 6C:
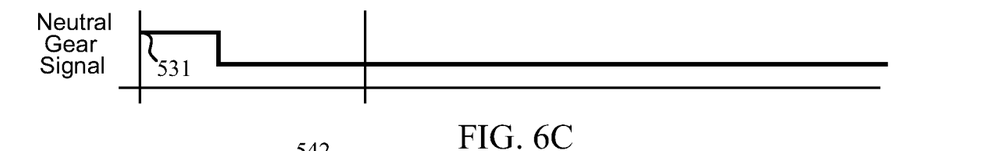
Figure 6D:
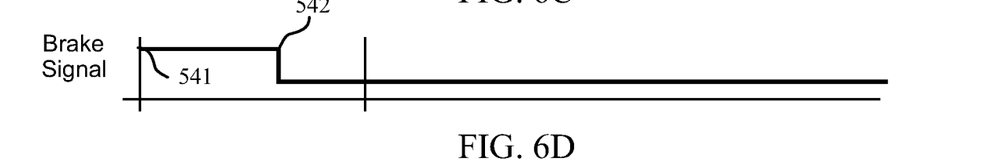
Figure 6E:
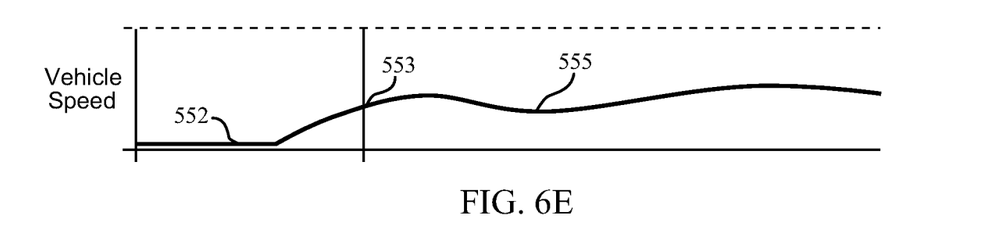

FIGS. 6A-6E show a modification of various features and operations similar to the charts shown in FIGS. 4A-4E and 5A-5E, in accordance with an aspect of the disclosure. In FIGS. 6A-5E, shown is a third target engine speed 512 and an actual engine speed 510 (FIG. 6A) that varies with respect to a detected vehicle speed. Similarly to FIGS. 4A-4E and 5A-5E, FIGS. 6A-5E show curves of various features and operations in a time-correlated format wherein the x-axis of each graph represents time. The y-axis of each graph represents the quantity stated in each graph's y-axis label. FIG. 6A represents one example data curve 512 of a target engine speed with relation to time during various operating conditions. FIG. 6B shows one example of a transmission reverse signal chart, and FIG. 6C shows one example of a transmission neutral signal chart. FIG. 6D shows one example of a brake signal curve, and FIG. 6E shows an example of a vehicle speed curve.

In one example operation, engine speed may be controlled to a first target engine speed S2' as represented by reference 411 in FIG. 6A while a vehicle transmission is in neutral 531 (FIG. 6C). When a vehicle neutral signal is present 531 (FIG. 6C) and a reverse gear signal is not present 521 (FIG. 5B), the target engine speed S1' (FIG. 6A) may be controlled to an engine idle speed that is determined to reduce noise and/or vibration. While target engine idle speed S1' (FIG. 5A) may reduce noise and/or vibration when the vehicle is in a neutral gear, target engine idle speed S1' (FIG. 6A) may be higher than an optimal engine speed for operation of the vehicle in a reverse gear. Once the transmission is shifted from a neutral gear to a reverse gear while a brake function of the vehicle is in use, i.e., a neutral gear signal is not present, a reverse gear signal is present 522 (FIG. 6B), and a brake signal is present 541 (FIG. 6D), the target engine speed may be gradually decreased from the first target engine speed S1' to a second target engine speed S2' at time 413 (FIG. 6A). A second target engine speed S2' (FIG. 6A) may be an engine speed that causes some vibration and/or noise, but is considered appropriate for operating a vehicle in a reverse speed. As shown in FIG. 6A, a target engine speed represented by plot 512 may vary from an actual engine speed represented by plot 510.

Further, the target engine speed shown in plot 512 may be controlled to smooth out a transition from a first engine speed S1' to a second actual engine speed S2' as shown by plot 510. Further, the second target engine speed S2' may be an engine speed that assists in preventing a user or passengers of the vehicle from detecting or noticing a change in engine speed from S1' to S3'. Once a brake signal is no longer present 542 (FIG. 6D), and a vehicle speed begins to increase from zero at 552 to a threshold speed 553 (FIG. 6E), the target engine speed is gradually decreased from target engine speed S2' (FIG. 6A) to a third target engine speed S4 at 512 (FIG. 6A). As shown in FIG. 6A, a first target engine speed S1' may be greater than a second target engine speed S2', and the second target engine speed S2' may be greater than the third target engine speed S4. In the aspect of the disclosure shown in FIG. 6A, the third target engine speed S4 may be a function of a vehicle speed. For example, as a vehicle's speed is increased 553 (FIG. 6E) while the vehicle is idling a reverse gear, the target engine idle speed 512 and actual engine idle speed 510 (FIG. 6A) may be gradually decreased as shown by reference 509 to cause a decrease or a steady vehicle speed as shown by reference 555 (FIG. 6E) while the vehicle is in a reverse gear. It is noted that while a brake pedal or brake function release is shown by reference 542 (FIG. 6C) at a time when a target engine speed is reduced to S4, the disclosure is not limited as such. For example, a target engine speed may be reduced independently of a brake function detection and may be based on an increase in vehicle speed and/or a vehicle speed increasing past a threshold value (e.g., 553 in FIG. 6E). Further, while target engine speed is mentioned as a function of a vehicle speed in one aspect, engine speed may also be an interpolation based on a determined vehicle speed, for example. Using the aforementioned control, vehicle noise and/or vibration may be reduced, while allowing the engine speed to be controlled to an appropriate idle speed when the vehicle is operated in reverse. Further, the aforementioned system may help prevent a user and/or passengers of the vehicle from detecting the variation of engine target idle speeds during a range of operations.

Figure 7:
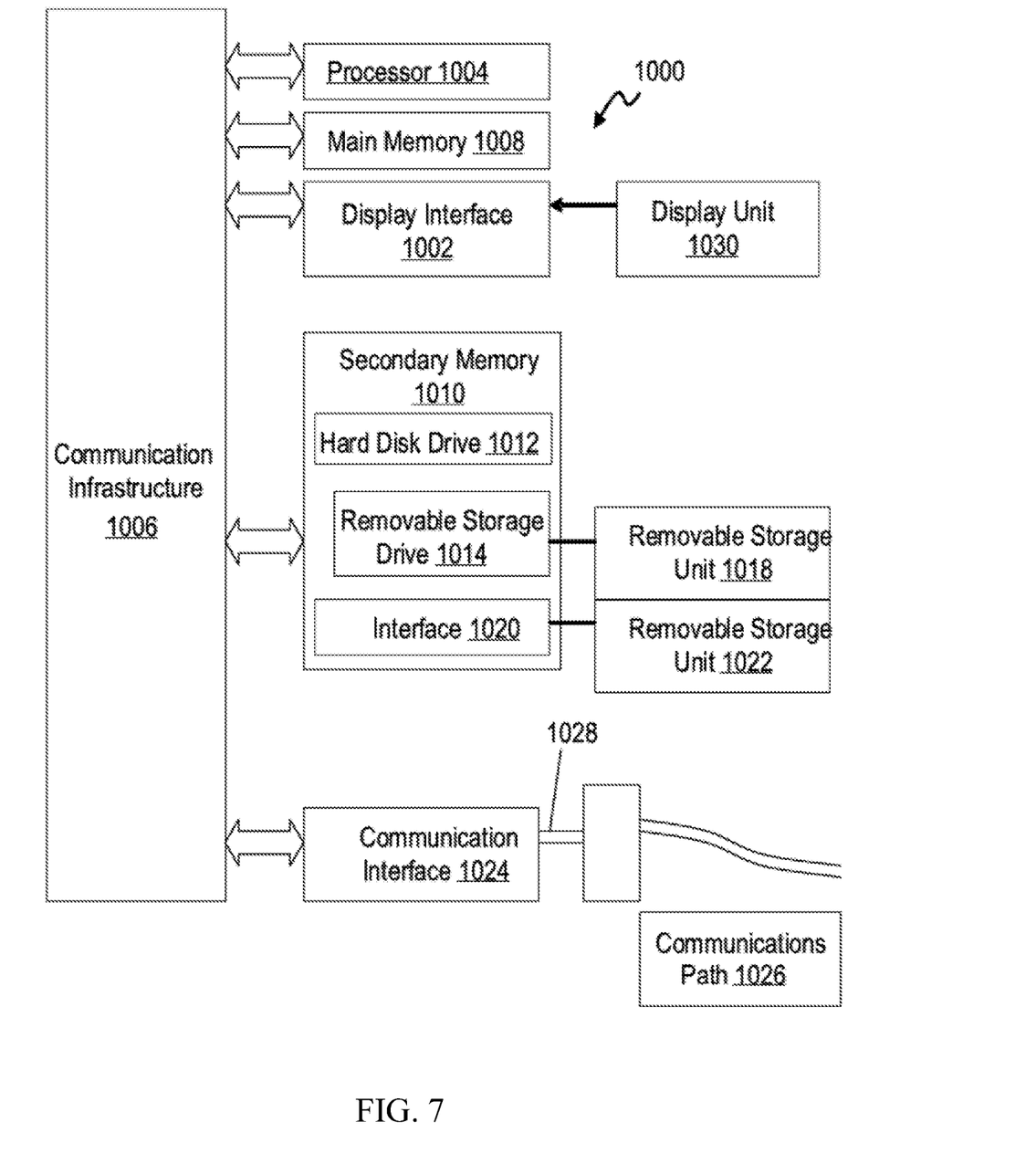
FIG. 7 illustrates an example computer system for an electronic system in accordance with an aspect of the disclosure.

Various aspects of the abovementioned idle control and various system features shown and described in relation to FIGS. 1-6E may be implemented using hardware, software, or a combination thereof and may be implemented in one or more computer systems or other processing systems. In an aspect of the present disclosure, features are directed toward one or more computer systems capable of carrying out the functionality of the data processing disclosed above. An example of such a computer system 1000 is shown in FIG. 7.

Computer system 1000 includes one or more processors, such as processor 1004. The processor 1004 is connected to a communication infrastructure 1006 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., that is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, that allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs).

Figure 8:
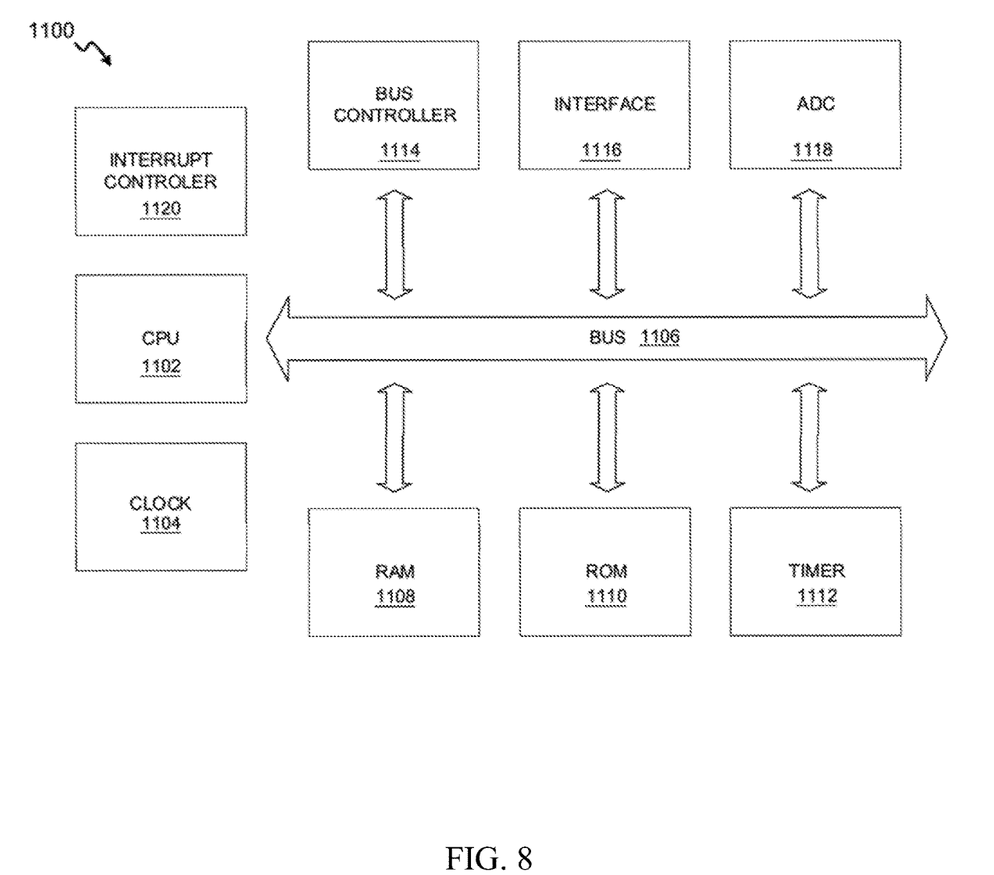
FIG. 8 is an example microcontroller in accordance with an aspect of the disclosure.

In some implementations, one or more microcontrollers may be implemented for carrying out certain features of the present disclosure, such as control features contained the engine and transmission control and system and/or PCM 108 of FIG. 1 and/or the idle control methods discussed with relation to FIGS. 2-5E. An example of such a microcontroller 1100 is shown in FIG. 8. The microcontroller 1100 includes a central processing unit (CPU) 1102, random access memory (RAM) 1108, read only memory (ROM) 1110, a timer 1112, an omnibus (BUS) controller 1114, an interface 1116, and an analog-to-digital converter (ADC) 1118 interconnected via an on board BUS 1106.

The CPU 1102 may be implemented as one or more single core or multi-core processors, and receive signals from an interrupt controller 1120 and a clock 1104. The clock 1104 sets the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU to suspend CPU operations. The interrupt controller 1120 may transmit an interrupt signal to the CPU when an event requires immediate CPU attention.

The RAM 1108 may include one or more SRAM, DRAM, SDRAM, DDR SDRAM, DRRAM or other suitable volatile memory. The ROM 1110 may include one or more PROM, EPROM, EEPROM, flash memory, or other types of non-volatile memory.

The timer 1112 may keep time and/or calculate the amount of time between events occurring within the microcontroller 1100, count the number of events, and/or generate baud rate for communication transfer. The BUS controller 1114 prioritizes BUS usage within the microcontroller 1100. The ADC 1118 allows the microcontroller 1100 to send out pulses to signal other devices.

The interface 1116 is an input/output device that allows the microcontroller 1100 to exchange information with other devices. In some implementations, the interface 1116 may include one or more parallel port, a serial port, or other computer interfaces.

The aspects discussed herein can also be described and implemented in the context of computer-readable storage medium storing computer-executable Instructions. Computer-readable storage media Includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A method for controlling an idle speed of an internal combustion engine, the method comprising:
   detecting a neutral engagement of a transmission;
   detecting a forward or reverse gear activation of the transmission;
   detecting a brake function activation;
   setting an engine target idle speed to a first idle speed during the neutral activation; and
   setting an engine target idle speed to a second idle speed during the forward or reverse gear activation and brake activation, wherein the engine idle speed is set to a third idle speed when a brake de-activation occurs while the forward or reverse is activated, wherein the first target idle speed, the second target idle speed, and the third target idle speed include different engine speeds.

2. The method for controlling an idle speed of an internal combustion engine of claim 1 wherein if a first target idle speed is represented by variable V1, a second target idle speed is represented by variable V2 and a third target idle speed is represented by variable V3, the following inequality is satisfied: V3<V2<V1.

3. The method for controlling an idle speed of an internal combustion engine of claim 2 further comprising:
   detecting a vehicle speed, wherein the third target idle speed is a function of the detected vehicle speed.

4. The method for controlling an idle speed of an internal combustion engine of claim 1, wherein detecting a brake function activation comprises detecting at least one of a group consisting of a brake pedal engagement and a parking brake engagement.

5. The method for controlling an idle speed of an internal combustion engine of claim 1, wherein detecting a brake function activation further comprises detecting a vehicle speed.

6. The method for controlling an idle speed of an internal combustion engine of claim 1, wherein the forward or reverse gear engagement is a transmission reverse gear engagement.

7. A method for controlling an idle speed of an internal combustion engine comprising:
   detecting a transmission neutral engagement of a transmission;
   detecting a forward or reverse gear engagement of the transmission;
   detecting a vehicle speed;
   setting an engine target idle speed to a first idle speed during the neutral engagement; and
   setting an engine target idle speed to a second idle speed when a vehicle speed is less than a threshold speed when the forward or reverse gear is activated, wherein the engine idle speed is set to a third idle speed when the vehicle speed is greater than the threshold speed while the forward or reverse gear is activated.

8. The method of claim 7, wherein if a first target idle speed is represented by variable V1, a second target idle speed is represented by variable V2 and a third target idle speed is represented by variable V3, the following inequality is satisfied: V3<V2<V1.

9. The method for controlling an idle speed of an internal combustion engine of claim 7, wherein the third idle speed is a function of a detected vehicle speed.

10. The method for controlling an idle speed of an internal combustion engine of claim 7, wherein the threshold speed is zero miles per hour.

11. The method for controlling an idle speed of an internal combustion engine of claim 7, wherein the threshold speed is 2 miles per hour.

12. The method for controlling an idle speed of an internal combustion engine of claim 7, wherein the third target idle speed is a function of the detected vehicle speed.

13. The method for controlling an idle speed of an internal combustion engine of claim 7, further comprising:
   detecting a brake function activation, wherein the engine idle speed is set to the third idle speed when a brake function is de-activated while the transmission forward or reverse gear is activated.

14. The method for controlling an idle speed of an internal combustion engine of claim 13, wherein detecting a brake function activation comprises detecting at least one of a group consisting of a brake pedal engagement and a parking brake engagement.

15. The method for controlling an idle speed of an internal combustion engine of claim 7, wherein the forward or reverse gear activation is a transmission reverse gear activation.

16. A system for controlling a target idle speed of a vehicle internal combustion engine comprising:
   a controller capable of determining a neutral engagement of a transmission;
   a speed detection device providing a signal corresponding to a vehicle speed to the controller; and a transmission forward or reverse gear engagement detection device providing a signal corresponding to a forward or reverse gear engagement state of the transmission, wherein the controller sets an engine target idle speed to a first target idle speed when the transmission is determined to be in a neutral engagement; the controller sets an engine target idle speed to a second target idle speed when the controller determines that a vehicle speed is less than a threshold speed and the forward or reverse gear is activated, and the controller sets the engine idle speed to a third target idle speed when the controller determines that a vehicle speed is greater than the threshold speed and the forward or reverse gear is activated.

17. The System of claim 16 wherein if a first target idle speed is represented by variable V1, a second target idle speed is represented by variable V2 and a third target idle speed is represented by variable V3, the following inequality is satisfied: V3<V2<V1.

18. The system of claim 16, wherein the forward or reverse gear engagement is a transmission reverse gear engagement.

19. The system of claim 17, wherein the controller sets a third target idle speed to be a function of a determined vehicle speed.

20. The system of claim 16, further comprising:
a brake function detection device providing a signal to the controller, wherein the controller sets the engine idle speed to the third idle speed when the determination is made that a brake function is de-activated while the transmission forward or reverse gear is activated.

* * * * *